Oct. 13, 1959

G. A. PRICE 2,908,143

COMBINED AIR CONDITIONER AND FUEL SYSTEMS
FOR AUTOMOTIVE VEHICLES

Filed March 17, 1958

INVENTOR.
GEORGE A. PRICE
BY

*ATTORNEY*

2,908,143

COMBINED AIR CONDITIONER AND FUEL SYSTEMS FOR AUTOMOTIVE VEHICLES

George A. Price, St. Francis, Kans.

Application March 17, 1958, Serial No. 721,703

3 Claims. (Cl. 62—7)

This invention relates to a combined air conditioning and fuel supply system for automotive vehicles and more specifically to the type of automotive vehicles employing liquid petroleum gas as the engine fuel.

The principal object of the invention is to provide a combination of elements which will enable liquid petroleum gas to be first utilized in a refrigerating unit after which the same gas will be utilized as the engine fuel thereby obtaining an additional function from the gas at no increase in fuel costs.

Another object of the invention is to provide a combined air conditioning and fuel system for automotive vehicles which can be quickly and easily applied to present gas driven vehicles and which will not in any way interfere with the normal operation of the engine and in which a portion of the gas usually supplied by the engine will be by-passed for air conditioning purposes without interfering with its function as an engine fuel.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

The improved system is directed to the use of liquified petroleum gases of the types at present in use as a motor fuel on automotive vehicles such as trucks, busses, etc. Such a gas may be butane, propane, or a butane-propane mixture and will be hereinafter referred to as LP gas.

Figure 1:
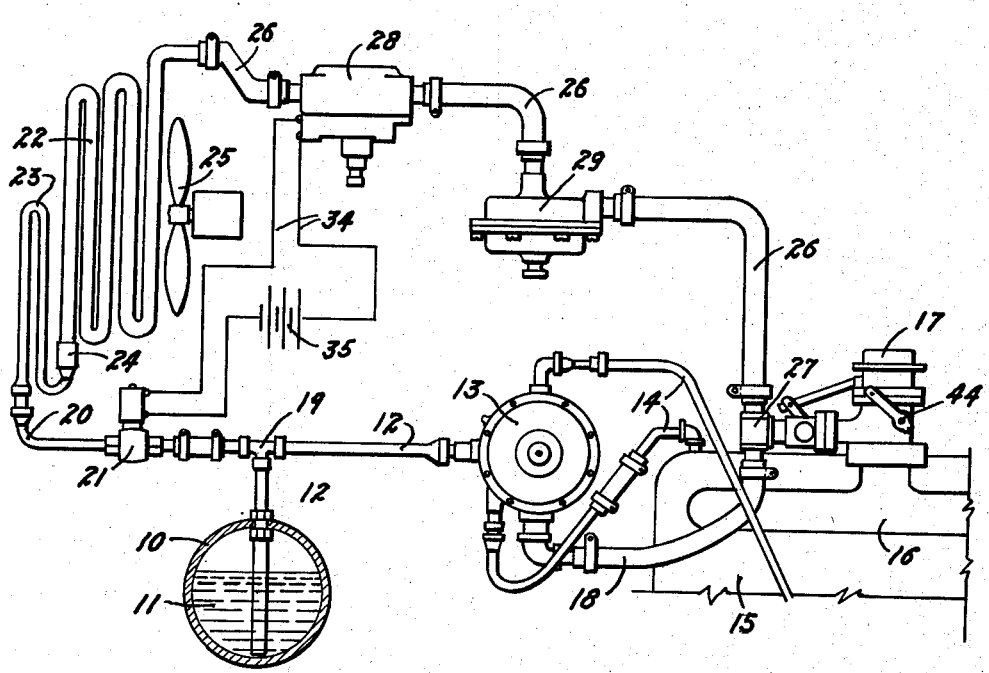
Fig. 1 is a diagrammatic representation of the gas flow through the improved system including the electrical circuits involved.

In Fig. 1 the usual elements of an LP gas fuel system for automotive engines are designated by numerals as follows: fuel tank 10, LP gas at 11, liquid fuel line 12, converter-regulator unit 13, circulating water lines 14, automotive engine 15, intake manifold 16, LP gas carburetor 17, vacuum vapor conduit 18, and throttle valve 44. The converter-regulator unit 13 may be any of the conventional models at present on the market, such as a "Century model M-4 converter." All of the above described elements and their illustrated connections are conventional.

In applying this invention to the above fuel system, a liquid fuel T 19 is placed in the liquid fuel line 12 by means of which liquid LP gas may be supplied through a liquid line 20, controlled by a normally-open solenoid valve 21, to an evaporator coil 22 provided with an air circulating fan 25. The liquid line 20 is connected through a cooling loop 23 adjacent the evaporator coil 22 to eliminate the possibility of vapor pockets in the liquid line. The liquid LP gas is expanded into the evaporator coil 22 through the jet of an expansion valve 24 which may be of a type such as used on conventional refrigeration units. The metering jet orifice of the expansion valve 24 is of a size dependent upon the fuel requirement necessary for normal operation of the engine 15.

The expansion of the liquid LP gas in the evaporator coil 22 chills the coil and in turn chills the air stream of the fan 25 for air conditioning purposes. The expanded vapor discharges from the evaporator coil 22 through a vapor line 6 to a vapor T 27 installed in the vacuum vapor line 18 of the engine fuel system so that the carburetor 17 may draw the vapor fuel from either the vapor conduit 18 or the vapor line 26.

Figure 2:
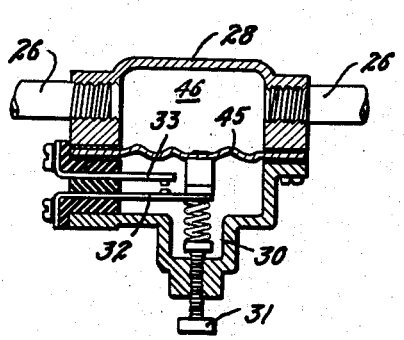
Fig. 2 is a longitudinal section through a pressure regulator switch as employed in the improved system.

The flow of vapor through the vapor line 26 is controlled by a pressure-actuated switch unit 28 and a vapor regulator unit 29. The pressure actuated switch unit 28 may be of any suitable variety or type arranged to close an electric circuit 34, when the vapor pressure in the vapor line descends below a predetermined point. One type of such a switch is illustrated in Fig. 2 in which the vapor line 26 leads through a vapor passage 46, one wall of which is closed by a flexible diaphragm 45. Vapor pressure in the passage 46 tends to force the diaphragm 45 outwardly against the bias of a pressure regulating spring 30, the compression in which may be regulated by means of a set screw 31. This outward movement of the diaphragm forces a movable switch contact 32 from a fixed switch contact 33 so as to break an electric circuit therebetween. Decrease in pressure in the passage 46 allows the diaphragm 45 to move inwardly so as to make an electrical contact between the switch contacts 32 and 33. The switch contacts are connected in series with the electrical circuit 34 which also includes a power source or battery 35 and the solenoid of the solenoid valve 21. Thus, an increase in pressure in the vapor line 26 will deenergize the circuit 34 at the switch contacts 32 and 33 to allow the normally-closed solenoid valve 21 to close the liquid line 20.

Figure 3:
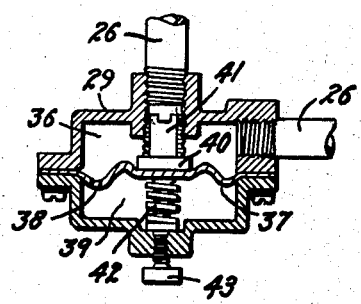
Fig. 3 is a similar section through a liquid petroleum vapor regulator unit employed in the system.

The vapor regulator unit 29 may have any necessary construction which will control the flow of vapor through the vapor line 26 in proportion to the demands of the engine 15. One such construction is illustrated in Fig. 3, in which the vapor line 26 communicates through a vapor chamber 36 which is closed at one side by means of a flexible diaphragm 37. The diaphragm 37 is by-passed by a by-pass passage or by means of a suitable bleed port 38 formed in the diaphragm, which communicates with a vacuum pocket 39 on the side of the diaphragm opposite from the vapor chamber 36. The diaphragm 37 carries a valve disc 40 mounted thereon which is positioned to close the lower extremity of a cylindrical valve seat sleeve 41 into which the vapor line 26 discharges. The valve disc 40 is constantly urged toward the seat sleeve 41 to close the latter by means of a suitable valve spring 42, the reaction of which can be regulated by means of a regulating screw 43.

Thus, it can be seen that, due to the suction of the intake manifold 16 the pressure in the out-going vapor line and in the chamber 36 and the pocket 39 will be less than the pressure in the incoming vapor line 26 so that the valve 40 will be drawn away from the valve seat sleeve 41 allowing normal vapor fuel to flow to the carburetor 17. Decreased demand by the engine, however, will increase the pressure in the pocket 39 allowing the spring 42 to close the valve disc 40 against the seat. Thus, vapor flows through the regulator unit 28 only when a partial vacuum is created by the engine. The regulator unit 28 is set so that less vacuum is required to open the valve disc 40 than is required to open the valve in the converter-regulator unit 13. Therefore, as long as it is possible for the engine to obtain sufficient fuel vapor through the vapor line 26, no gas will flow through the vapor line 18. However, should the engine require more fuel than is being expanded in the evaporator coil 22, the increased vacuum in the line 18 will open the converter-regulator unit 13 so that the additional fuel required will be drawn through the vacuum vapor conduit 18 of the fuel system.

Let us assume that the engine 15 is being operated at a preset speed and under a preset load, unit 13 is closed and that all of the fuel is being supplied through the liquid line 20, the evaporator coil 22 and the vapor line 26. Now let us assume that the load lessens or that a lower speed is required, and that the throttle valve 44 is turned toward the closed position, this immediately increases the pressure in the vapor line 26 causing the diaphragm 45 to open the electric circuit 34 thereby closing the solenoid valve 21 to prevent the entrance of further LP gas to the evaporator unit until the pressure in the vapor line 26 has returned to the present valve.

The settings of the converter regulator unit 13, the pressure regulator 28, and the vapor regulator unit 29, are such that under average conditions, all of the fuel to the engine 15 will be supplied through the refrigeration or air conditioning unit so that the latter is operating entirely on the engine fuel supply and the engine is operating entirely on the air conditioning discharge without interference with the operation of either unit and without increasing the normal fuel cost.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A combined air conditioning unit and fuel supply for the engine of an automotive vehicle comprising: a liquid petroleum gas container; an evaporator coil; an expansion valve; a liquid conduit conducting petroleum gas in the liquid phase from said container to said evaporator coil through said expansion valve to expand said gas to a vapor phase within said evaporator coil to chill the latter; means for forcing the air to be conditioned into heat exchange relation with said evaporator coil for conditioning said air; a carburetor arranged to supply aerated gas fuel to said engine; a vapor conduit communicating between said evaporator coil and said carburetor and conducting the expanded vapor from said evaporator coil to said carburetor to supply the gas for said fuel; a second liquid conduit 12 conducting petroleum gas in the liquid phase from said container; a vacuum operated convertor regulator unit for expanding the gas from the second liquid conduit to a vapor phase; a second vapor conduit conducting the vapor from said convertor regulator unit to said carburetor for intermixture with the gas from the first vapor conduit; and a vacuum-operated valve controlling the flow of vapor through said first vapor conduit, said vacuum operated convertor regulator unit controlling the flow of vapor through said second vapor conduit, said vacuum operated valve being arranged to allow vapor flow at less vacuum than required to operate said convertor regulator unit so that all flow will be through the first vapor conduit until a predetermined vacuum is reached.

2. A combined air conditioning unit and fuel supply as described in claim 1 having means for automatically preventing liquid flow to said first expansion valve in consequence of a rise in pressure in said first vapor conduit.

3. A combined air conditioning unit and fuel supply as described in claim 2 in which the means for automatically preventing liquid flow comprises an electrically-operated valve in said first liquid conduit; a pressure actuated switch in said first vapor conduit; and an electric circuit including a source of current in circuit with said pressure operated switch and said electrically operated valve so that actuation of the former will actuate the latter.

References Cited in the file of this patent

UNITED STATES PATENTS

| | | |
|---|---|---|
| 1,905,971 | Davisson | Apr. 25, 1933 |
| 2,120,166 | Tonkin | June 7, 1938 |
| 2,701,133 | Mendez | Feb. 1, 1955 |